Patented May 1, 1945

2,375,055

UNITED STATES PATENT OFFICE 2,375,055

BITUMINOUS COATING COMPOSITIONS AND PROCESSES

Bruce Weetman, Glenham, and Robert Jamieson Agnew, Beacon, N. Y., assignors, by mesne assignments, to The Texas Company, New York, N. Y., a corporation of Delaware No Drawing. Application August 15, 1941, Serial No. 407,070

15 Claims. (Cl. 106—273)

Our invention relates to bituminous coating compositions of improved adhesive properties, and to an improved method of coating mineral aggregates with bituminous materials to secure better adhesion between the bituminous material and the aggregate.

It is well known that mineral aggregates, and especially those of an igneous or siliceous nature, are difficult to coat with bituminous materials when moisture is present on the surface of the aggregate. Similarly, it is known that in service the bituminous materials tend to strip from the aggregate in the presence of water. In the past a number of expedients, such as the use of adhesion improving agents, have been suggested for overcoming these difficulties, but none of these have been entirely satisfactory from a commercial standpoint. Up to the present time the most satisfactory adhesion improving agents have been combinations of lime and oil-soluble polyvalent metal soaps of high molecular weight acids, such as those disclosed in copending application Serial No. 407,067, by Bruce Weetman, filed August 15, 1941. In the use of such combination, however, it is necessary to pretreat the aggregate with the lime, before coating with the bituminous material containing the oil-soluble soap. This pretreating of the aggregate is expensive, even in plant mixing operations, and is obviously undesirable for road mixing operations.

We have now found that the lime pretreatment and its attendant disadvantages may be avoided by effecting the coating operation in the presence of both an oil-soluble, water-insoluble polyvalent metal soap of a high molecular weight acid and a surface active compound which is oil-soluble and at least partially water-soluble. In accordance with our preferred method of operation, both the polyvalent metal soap and the water-soluble surface active compound are incorporated directly in the bituminous material, which may then be employed to coat aggregates in accordance with any of the conventional procedures. Bituminous materials containing both the polyvalent metal soap and the water-soluble surface active compound may be used satisfactorily for the coating of wet aggregates, and the resulting coated aggregates will be found to have greatly improved resistance to the stripping action of water.

The adhesive properties of other types of bituminous coating compositions, such as paints, cements, and the like, are also improved by the use of our combination of water-insoluble and water-soluble adhesion improving agents. However, the greatest difficulties in respect to lack of adhesion are encountered in bituminous paving materials for the coating of mineral aggregates, and our invention will be described with particular reference to such compositions.

Any surface active compound which is oil-soluble and at least partially water-soluble may be employed in our present invention. As used herein, the term soluble is to be construed as meaning easily and completely dispersible in the concentration employed, as well as truly soluble. Any emulsifying agent, wetting agent, detergent, or the like, having the specified solubilities has adhesion improving properties when used in conjunction with a polyvalent metal soap, but we have found that emulsifying agents of the class comprising oil-soluble soaps of high molecular weight acids and mono-valent bases are particularly suitable for this purpose. As examples of this type of emulsifying agent there may be mentioned the oil-soluble alkali metal mahogany sulfonates and the amine and hydroxyamine soaps of the higher fatty acids. For economic reasons, we generally prefer to employ oil-soluble and water-soluble mahogany sulfonates, such as the alkali metal, ammonium, and substituted ammonium soaps of mahogany sulfonic acids. The sodium mahogany sulfonates, which are readily available commercially, are very satisfactory for our process, and we have successfully used commercial materials having sodium sulfonate concentrations ranging from 27% to 75%.

The optimum amount of water-soluble surface active compound for any particular application will vary to some extent depending upon the nature of the aggregate to be coated and the amount of water present on the surface of the aggregate. Generally, a higher concentration of such compound is required for the successful coating of igneous and siliceous aggregates than is required for coating calcareous aggregates. It is also generally desirable to employ a somewhat higher concentration for the coating of very wet aggregates than is used for coating aggregates which are dry or only slightly moist. Concentrations of surface active compound ranging from 0.1% to 2.0%, based on the weight of the bituminous material, will usually be found to be satisfactory, and we generally prefer to employ from 0.5% to 1.0%.

The oil-soluble and water-soluble surface active compound may be used in conjunction with any of the oil-soluble, water-insoluble polyvalent metal soaps of high molecular weight acids, such as the higher fatty acids, oxidized paraffin wax acids, rosin acids, naphthenic acids, sulfonic acids, and the like. Soaps of acids containing at least 12 carbon atoms are most desirable for this purpose. Any oil-soluble, water-insoluble polyvalent metal soaps of such acid may be used, as for example, the lead, zinc, iron, copper, calcium, and aluminum soaps. We generally prefer, however, to use the lead, zinc, and iron soaps, and particularly these soaps of high molecular weight acids derived from the oxidation of petroleum hydrocarbons. Suitable soaps of the latter type are described in copending application Serial No. 407,067, referred to above.

The optimum amount of polyvalent metal soap for any particular application will vary to some extent with the nature of the aggregate and the amount of water on the aggregate in the same manner as the optimum amount of the water-soluble surface active compound varies, as pointed out above. Usually, however, from 0.5% to 5.0% of the polyvalent metal soap, based on the weight of the bituminous material, will be satisfactory, and we generally prefer to use from 1% to 3% of soap.

Both the water-soluble surface active compound and the water-insoluble polyvalent metal soap are preferably incorporated directly in the bituminous material, and it is by this means that the greatest advantages of our process are secured. However, it is apparent that various modifications of this procedure could be used, as for example, pretreating the aggregate with either or both the water-soluble surface active compound and the polyvalent metal soap. For such pretreatment a solvent, such as kerosene or a very light bituminous surfacing material, could advantageously be employed to secure adequate distribution of the treating agents. Either in such pretreating processes or in employing bituminous material containing both of the adhesion improving agents, standard coating procedures may be employed, and the bitumen may be used in any of the conventional forms, such as molten bitumen, bitumen cut-back with naphtha, and the like. Our adhesion improving agents are adapted for use in conjunction with all types of coating operations, including plant mixing, stock piling, road mixing, and surface treating.

Our invention may be further illustrated by the following specific examples:

Example I

Dry aggregates were mixed with 2% by weight of water, and samples of the resulting wet aggregates were coated with 4% by weight of an asphalt cut-back, comprising 73% of an air-blown asphalt of 65–70 penetration and 27% of 140–400 naphtha distillate. The cut-back had a 122° F. Saybolt Furol viscosity of 340 seconds and was applied at a temperature of approximately 120° F. by stirring with the aggregate for one minute.

Additional samples of the moistened aggregates were coated with an asphalt cut-back of the same composition containing 0.5% by weight of sodium mahogany sulfonate and 2% by weight of an oxidized wax zinc soap. The mahogany sulfonate comprised a commercial material of approximately 65% sodium sulfonate content which was easily and completely dispersible in both oil and water. The soap was prepared by double decomposition of an oxidized wax sodium soap by means of a water-soluble zinc salt. The oxidized wax, which was obtained by oxidizing paraffin wax at a temperature of 250° F. with air at the rate of three cubic feet per hour per pound of wax, in the presence of 1% manganese naphthenate as a catalyst, had a saponification number 194, and contained 33% unsaponifiable matter.

Further samples of the moistened aggregates were coated with an asphalt cut-back of the same composition, but containing 1% by weight of sodium mahogany sulfonates together with 2% by weight of the oxidized wax zinc soap.

In each case the percent of the area of the aggregate coated by the bituminous material was visually estimated, after which the coated materials were subjected to a curing period of 48 hours at a temperature of 160° F.

After curing, the coated aggregates were subjected to the Nicholson stripping test (Proceedings of the Association of Asphalt Paving Technologists, January 1932, page 43). This test was modified by adding an additional test period at 140° F. and by estimating the percent of the area of the aggregate exposed by stripping at the end of each test period.

The percent initial coating and the percent stripped after each test period in the stripping test are shown in the table below:

| Aggregate | Oxidized wax zinc soap, per cent of cut-back | Mahogany sulfonate, per cent of cut-back | Per cent initial coating | Per cent stripped after successive test periods | | | | |
|---|---|---|---|---|---|---|---|---|
| | | | | °F. 80 | °F. 80 | °F. 100 | °F. 120 | °F. 140 |
| Wisconsin gravel | 0.0 | 0.0 | 45 | 33 | 55 | 75 | 90 | 95 |
| Do | 2.0 | 0.5 | 75 | 5 | 5 | 10 | 25 | 65 |
| Do | 2.0 | 1.0 | 95 | 5 | 5 | 10 | 20 | 45 |
| Trap rock | 0.0 | 0.0 | 35 | 15 | 20 | 35 | 45 | 70 |
| Do | 2.0 | 0.5 | 75 | 3 | 3 | 8 | 10 | 15 |
| Do | 2.0 | 1.0 | 95 | 3 | 3 | 3 | 3 | 3 |
| Virginia granite | 0.0 | 0.0 | 85 | 3 | 15 | 25 | 35 | 65 |
| Do | 2.0 | 0.5 | 95 | 3 | 3 | 8 | 8 | 10 |
| Do | 2.0 | 1.0 | 95 | 3 | 3 | 5 | 8 | 10 |

Example II

The procedure of Example I was followed, utilizing 5% of cut-back, based on the weight of the aggregate, and 3% of oxidized wax zinc soap together with 1% of sodium mahogany sulfonate, based on the weight of the cut-back. The percent initial coating and the stripping test results are shown in the table below:

| Aggregate | Oxidized wax zinc soap, per cent of cut-back | Mahogany sulfonate, per cent of cut-back | Per cent initial coating | Per cent stripped after successive test periods | | | | |
|---|---|---|---|---|---|---|---|---|
| | | | | °F. 80 | °F. 80 | °F. 100 | °F. 120 | °F. 140 |
| Rhyolite | 0.0 | 0.0 | 25 | 20 | 50 | 70 | 80 | 90 |
| Do | 3.0 | 1.0 | 95 | 3 | 3 | 3 | 3 | 8 |
| Trap rock | 0.0 | 0.0 | 25 | 20 | 30 | 60 | 60 | 80 |
| Do | 3.0 | 1.0 | 95 | 3 | 3 | 3 | 3 | 3 |

Example III

The procedure of Example I was followed, utilizing 4% of cut-back, based on the weight of the aggregate, and 1% by weight of lead naphthenate together with 1% sodium mahogany sulfonate, based on the weight of the cut-back. The percent initial coating and the stripping test results are shown in the table below:

| Aggregate | Lead naphthenate, per cent of cut-back | Mahogany sulfonate, per cent of cut-back | Per cent initial coating | Per cent stripped after successive test periods ||||| 
|---|---|---|---|---|---|---|---|---|
| | | | | °F. 80 | °F. 80 | °F. 100 | °F. 120 | °F. 140 |
| Trap rock | 0.0 | 0.0 | 35 | 15 | 20 | 35 | 45 | 70 |
| Do | 1.0 | 1.0 | 70 | 3 | 8 | 10 | 15 | 20 |
| Virginia granite | 0.0 | 0.0 | 85 | 3 | 15 | 25 | 35 | 65 |
| Do | 1.0 | 1.0 | 95 | 3 | 3 | 8 | 20 | 35 |

Example IV

The procedure of Example I was followed, using 5% of cut-back, based on the weight of the aggregate, and 3% of zinc oleate together with 1% of sodium mahogany sulfonate, based on the weight of the cut-back. The percent initial coating and the stripping test results are shown in the table below:

| Aggregate | Zinc oleate, per cent of cut-back | Mahogany sulfonate, per cent of cut-back | Per cent initial coating | Per cent stripped after successive test periods |||||
|---|---|---|---|---|---|---|---|---|
| | | | | °F. 80 | °F. 80 | °F. 100 | °F. 120 | °F. 140 |
| Wisconsin gravel | 0.0 | 0.0 | 25 | 30 | 50 | 70 | 90 | 90 |
| Do | 3.0 | 1.0 | 85 | 3 | 8 | 15 | 30 | 40 |
| Trap rock | 0.0 | 0.0 | 25 | 20 | 30 | 60 | 60 | 80 |
| Do | 3.0 | 1.0 | 75 | 3 | 8 | 10 | 15 | 10 |

Example V

The procedure of Example I was followed, using 5% of cut-back, based on the weight of the aggregate, and 3% of oxidized wax zinc soap together with 1% of triethanolamine oleate, based on the weight of the cut-back. The percent initial coating and the stripping test results are shown in the table below:

| Aggregate | Zinc soap, percent of cut-back | Triethanolamine oleate, percent of cut-back | Percent initial coating | Percent stripped after successive test periods |||||
|---|---|---|---|---|---|---|---|---|
| | | | | °F. 80 | °F. 80 | °F. 100 | °F. 120 | °F. 140 |
| Rhyolite | 0.0 | 0.0 | 25 | 30 | 50 | 70 | 90 | 90 |
| Do | 3.0 | 1.0 | 85 | 3 | 3 | 10 | 30 | 40 |
| Virginia granite | 0.0 | 0.0 | 85 | 8 | 10 | 30 | 40 | 60 |
| Do | 3.0 | 1.0 | 100 | 3 | 3 | 8 | 10 | 10 |

Example VI

The procedure of Example I was followed, using 5% of cut-back based on the weight of the aggregate, 2% of oxidized wax zinc soap, in the form of a 67% solution in kerosene, based on the weight of the cut-back, and 0.5% of the monoamyl amine soap of the same oxidized wax, based on the weight of the cut-back. The percent initial coating, and the results of the stripping tests are shown in the table below:

| Aggregate | Zinc soap, percent of cut-back | Amine soap, percent of cut-back | Percent initial coating | Percent stripped after successive test periods |||||
|---|---|---|---|---|---|---|---|---|
| | | | | °F. 80 | °F. 80 | °F. 100 | °F. 120 | °F. 140 |
| Connecticut gravel | 0.0 | 0.0 | 45 | 15 | 25 | 30 | 45 | 75 |
| Do | 2.0 | 0.5 | 85 | 3 | 8 | 10 | 10 | 15 |
| Limestone | 0.0 | 0.0 | 45 | 10 | 25 | 30 | 45 | 65 |
| Do | 2.0 | 0.5 | 95 | 3 | 3 | 3 | 3 | 3 |

Example VII

The procedure of Example I was followed using 5% of cut-back, based on the weight of the aggregate, and 3% of oxidized wax zinc soap together with 1% of the 3-amino-4-heptanol soap of the same oxidized wax, based on the weight of the cut-back. The percent initial coating and the stripping test results are shown in the table below:

| Aggregate | Zinc soap, percent of cut-back | 3-amino-4-heptanol soap, per cent of cut-back | Percent coating | Percent stripped after successive test periods ||||| 
|---|---|---|---|---|---|---|---|---|
| | | | | °F. 80 | °F. 80 | °F. 100 | °F. 120 | °F. 140 |
| Rhyolite | 0.0 | 0.0 | 45 | 25 | 30 | 55 | 65 | 75 |
| Do | 3.0 | 1.0 | 85 | 8 | 8 | 8 | 8 | 8 |
| Trap rock | 0.0 | 0.0 | 45 | 15 | 15 | 20 | 25 | 35 |
| Do | 3.0 | 1.0 | 85 | 3 | 5 | 8 | 10 | 15 |

*Example VIII*

The procedure of Example I was followed, using 5% of cut-back, based on the weight of the aggregate, and 3% of oxidized wax zinc soap together with 1% of a wetting agent comprising a high molecular weight oxazoline stearate, based on the weight of the cut-back. The percent initial coating and the stripping test results are shown in the table below:

| Aggregate | Zinc soap, percent of cut-back | Wetting agent, per cent of cut-back | Per cent initial coating | Percent stripped after successive test periods ||||| 
|---|---|---|---|---|---|---|---|---|
| | | | | °F. 80 | °F. 80 | °F. 100 | °F. 120 | °F. 140 |
| Wisconsin gravel | 0.0 | 0.0 | 25 | 30 | 50 | 70 | 90 | 90 |
| Do | 3.0 | 1.0 | 75 | 3 | 3 | 3 | 3 | 8 |
| Virginia granite | 0.0 | 0.0 | 85 | 8 | 10 | 30 | 40 | 60 |
| Do | 3.0 | 1.0 | 100 | 3 | 3 | 3 | 8 | 3 |

As may be seen from the above examples, the use of oil-soluble and at least partially water-soluble surface active compounds, in conjunction with oil-soluble, water-insoluble polyvalent metal soaps of high molecular weight acids, results in very marked improvement both in the initial coating of wet aggregates, and in the resistance of the coated aggregates to water stripping. In the coating of dry aggregates, similar improvement in stripping resistance is obtained by the use of these materials, but improvement in initial coating is usually unnecessary in this case.

It is to be understood, of course, that these examples are merely illustrative and do not limit the scope of our invention. We have observed similar improvements in coating and stripping resistance when coating various other kinds of aggregates and when employing water-soluble surface active compounds and water-insoluble polyvalent metal soaps other than the specific compounds of the above examples. Our adhesion improving agents are also useful in all types of bituminous coating compositions, as well as the particular paving compositions of these examples. It is to be understood that the substitution of other types of bituminous compositions and other water-soluble surface active compounds and water-insoluble polyvalent metal soaps, and the use of any other equivalents and modifications of procedure which would naturally occur to one skilled in the art, are included in the scope of our invention. Only such limitations should be imposed on the scope of our invention as are indicated in the appended claims.

We claim:

1. A bituminous coating composition comprising bitumen and an oil-soluble, water-insoluble polyvalent metal soap of a high molecular weight acid in an amount ranging from 0.5-5.0 by weight of said bitumen and a surface active compound which is oil-soluble and at least partially water-soluble, in an amount ranging from 0.1-2.0% by weight of said bitumen.

2. An asphaltic coating composition containing an asphaltic coating material, an oil-soluble, water-insoluble polyvalent metal soap of a high molecular weight acid in an amount ranging from 0.5% to 5.0% of the weight of said asphaltic coating material, and an emulsifying agent which is oil-soluble and at least partially water-soluble in an amount ranging from 0.1% to 2.0% of the weight of said asphaltic coating material.

3. An asphaltic coating composition comprising an asphalt cut-back, an oil-soluble, water-insoluble polyvalent metal soap of high molecular weight acids derived from the oxidation of petroleum hydrocarbons, in an amount ranging from 0.5% to 5.0% of the weight of said asphalt cut-back, and an oil-soluble soap of a high molecular weight acid and a monovalent base in an amount ranging from 0.1% to 2.0% of the weight of said asphalt cut-back.

4. The composition of claim 3 in which the polyvalent metal soap is an oil-soluble, water-insoluble polyvalent metal soap of oxidized paraffin wax, and the emulsifying agent is an oil-soluble amine soap of a high molecular weight acid.

5. The composition of claim 3 in which the polyvalent metal soap is an oil-soluble, water-insoluble polyvalent metal soap of oxidized paraffin wax, and the emulsifying agent is an oil-soluble alkali metal soap of a high molecular weight acid.

6. The composition of claim 3 in which the polyvalent metal soap is an oil-soluble zinc soap of oxidized paraffin wax, and the emulsifying agent is an oil-soluble sodium mahogany sulfonate.

7. A process for coating mineral aggregate which comprises coating said aggregate with a liquid bituminous material in the presence of 0.5-5.0% of an oil-soluble, water-insoluble polyvalent metal soap of a high molecular weight acid and 0.1-2.0% of a surface active compound which is oil-soluble and at least partially water-soluble, said proportionate ranges being based upon the amount of said liquid bituminous material used in the coating of said aggregate.

8. A process for coating mineral aggregate which comprises coating said aggregate with a liquid asphaltic coating composition in the presence of 0.5-5.0% of an oil-soluble, water-insoluble polyvalent metal soap of a high molecular weight acid and 0.1–2.0% of an emulsifying agent which is oil-soluble and at least partially water-soluble, said proportionate ranges being based upon the amount of said liquid asphaltic coating composition used in the coating of said aggregate.

9. The process of claim 8 in which the polyvalent metal soap is an oil-soluble, water-insoluble soap of high molecular weight acids derived from the oxidation of petroleum hydrocarbons, and the emulsifying agent is an oil-soluble soap of a high molecular weight acid and a monovalent base.

10. A process for coating mineral aggregate which comprises applying to said aggregate an asphalt coating composition comprising an asphalt cut-back, an oil-soluble, water-insoluble polyvalent metal soap of a high molecular weight acid in an amount ranging from 0.5% to 5.0% of the weight of said asphalt cut-back, and an emulsifying agent which is oil-soluble and at least partially water-soluble in an amount ranging from 0.1% to 2.0% of the weight of said asphalt cut-back.

11. The process of claim 10 in which the polyvalent metal soap is an oil-soluble, water-insoluble soap of high molecular weight acids derived from the oxidation of petroleum hydrocarbons, and the emulsifying agent is an oil-soluble soap of a high molecular weight acid and a monovalent base.

12. The process of claim 10 in which the polyvalent metal soap is an oil-soluble, water-insoluble polyvalent metal soap of oxidized paraffin wax, and the emulsifying agent is an oil-soluble amine soap of a high molecular weight acid.

13. The process of claim 10 in which the polyvalent metal soap is an oil-soluble, water-insoluble polyvalent metal soap of oxidized paraffin wax, and the emulsifying agent is an oil-soluble alkalimetal soap of a high molecular weight acid.

14. The process of claim 10 in which the polyvalent metal soap is an oil-soluble zinc soap of oxidized paraffin wax, and the emulsifying agent is an oil-soluble sodium mahogany sulfonate.

15. A coated mineral aggregate, comprising crushed mineral matter, the individual pieces of which have a coating of bitumen bonded thereto by an oil-soluble, water-insoluble polyvalent metal soap of a high molecular weight acid in an amount ranging from 0.5–5.0% by weight of said bitumen and a surface active compound which is oil-soluble and at least partially water-soluble, in an amount ranging from 0.1–2.0% by weight of said bitumen.

BRUCE WEETMAN.
ROBERT JAMIESON AGNEW.